US011215758B1

(12) United States Patent
Dalvand et al.

(10) Patent No.: US 11,215,758 B1
(45) Date of Patent: Jan. 4, 2022

(54) FABRICATION-TOLERANT NON-LINEAR WAVEGUIDE TAPER

(71) Applicant: Juniper Networks, Inc., Sunnyvale, CA (US)

(72) Inventors: Naser Dalvand, Mountain View, CA (US); Erik Johan Norberg, Santa Barbara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/022,813

(22) Filed: Sep. 16, 2020

(51) Int. Cl.
*G02B 6/12* (2006.01)
*G02B 6/122* (2006.01)
*G02B 6/136* (2006.01)

(52) U.S. Cl.
CPC .......... *G02B 6/1228* (2013.01); *G02B 6/136* (2013.01); *G02B 2006/12061* (2013.01)

(58) Field of Classification Search
None
See application file for complete search history.

(56) References Cited

U.S. PATENT DOCUMENTS

| 2006/0126992 | A1* | 6/2006 | Hashimoto | ........ | G02B 6/12009 |
| | | | | | 385/14 |
| 2007/0077017 | A1 | 4/2007 | Menon et al. | | |
| 2008/0273829 | A1* | 11/2008 | Saida | ................ | G02B 6/12011 |
| | | | | | 385/14 |
| 2016/0012176 | A1* | 1/2016 | Liu | ........................ | G02B 6/107 |
| | | | | | 716/112 |
| 2016/0341896 | A1* | 11/2016 | Horth | ................... | G02B 6/1228 |
| 2017/0351124 | A1* | 12/2017 | Roth | ..................... | G02F 1/0121 |
| 2019/0137688 | A1 | 5/2019 | Lin et al. | | |

OTHER PUBLICATIONS

"European Application Serial No. 20211792.5, Extended European Search Report dated May 11, 2021", 11 pgs.
Vusirikala, V, "1,55-Mum Ingaasp-Inp Laser Arrays With Integrated-Mode Expanders Fabricated Using a Single Expitaxial Growth", IEEE Journal of Selected Topics in Quantum Electronics, IEEE Service Center, Piscataway, NJ, US, vol. 3, No. 6, (Dec. 1, 1997), 1332-1343.

* cited by examiner

*Primary Examiner* — Michael Stahl
(74) *Attorney, Agent, or Firm* — Schwegman Lundberg & Woessner, P.A.

(57) ABSTRACT

A fabrication-tolerant non-linear waveguide taper for a waveguide transition can be designed by computing the scattering rate associated with the waveguide transition as a function of waveguide width of the waveguide taper for each of multiple sets of parameter values characterizing the waveguide transition (e.g., a set of nominal parameter values and sets of parameter values associated with process corners representing process variations from the nominal parameter values), determining an envelope of the computed width-dependent scattering rates, and computing a non-linear taper profile of the waveguide taper based on the envelope. Light propagation and coupling along the waveguide transition may further be computationally simulated for the multiple sets of parameter values to determine a minimum transmission value associated with the waveguide transition for a specified taper length, and/or to determine a minimum taper length at which the transmission values associated with the waveguide transition exceed a specified threshold transmission value.

20 Claims, 13 Drawing Sheets

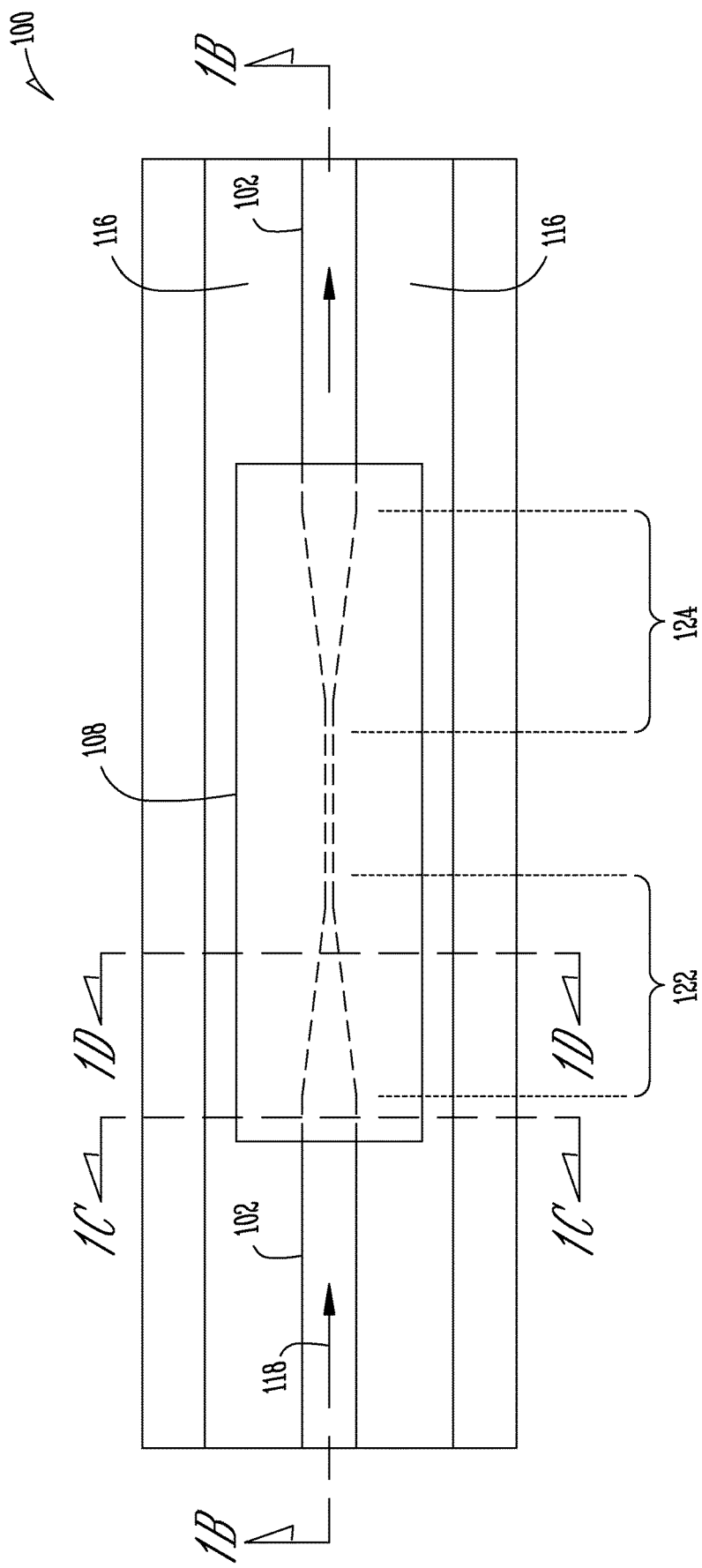

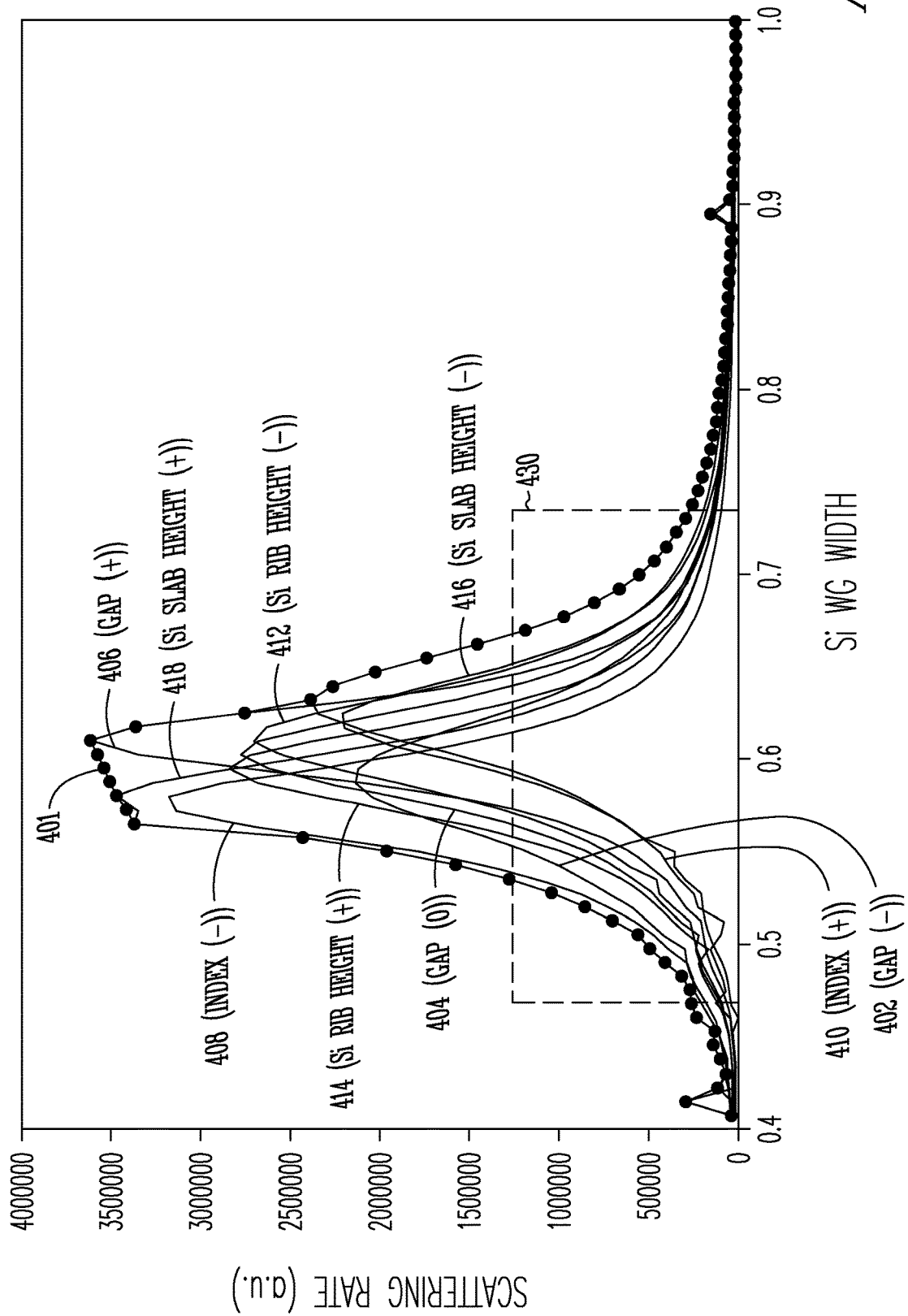

FABRICATION-TOLERANT NON-LINEAR WAVEGUIDE TAPER

TECHNICAL FIELD

This disclosure relates to optical waveguide transitions in photonic integrated circuits (PICs), e.g., heterogeneous transitions between silicon and III-V waveguides. More particularly, the disclosed embodiments pertain to the design and fabrication of tapered waveguides for low-loss transitions.

BACKGROUND

Silicon-based PICs benefit from low optical losses, ease of integration with electronic components, and manufacturability using standard photolithographic techniques. To allow for the integration of active photonic devices—such as lasers, optical amplifiers, optical modulators, and photodetectors—into the photonic circuits, III-V materials, which feature high electro-optic efficiency, may be combined with silicon in a heterogeneous (sometimes also referred to as "hybrid") material platform. A common way of achieving such heterogeneous material integration involves bonding III-V die to a pre-patterned silicon-on-insulator (SOI) wafer, and coupling light between a silicon waveguide in the wafer and the optically active III-V region. In some applications, the light couples evanescently from the silicon waveguide to the active region, but this approach provides only limited overlap between the optical mode and the active region, as a large portion of the optical mode remains guided in the silicon waveguide. To maximize the overlap with the active region, therefore, many applications use tapered waveguide transitions between silicon and III-V waveguides to fully transfer the optical mode to the waveguide and/or back to the silicon waveguide.

The performance of a laser or other active device utilizing a tapered waveguide transitions depends in no small part on the optical losses that the guided light incurs along the waveguide due to scattering into undesired higher-order modes. In general, scattering losses can be reduced by making the change in width more gradual, and thus the taper longer. However, longer tapers come with their own problems. In single-mode laser applications, for instance, the laser cavity, which includes the waveguide taper, is preferably made as short as possible to make single-mode operation easier. Also, light propagation losses in the bulk of the waveguide increase linearly with length. Accordingly, a low-loss, yet compact waveguide transition is desirable.

BRIEF DESCRIPTION OF THE DRAWINGS

In the following description of embodiments of the disclosed subject matter, reference is made to the accompanying drawings.

FIGS. 1A and 1B are top and side views, respectively, of an example heterogeneous photonic structure including waveguide transitions with a tapered bottom waveguide, in accordance with various embodiments.

FIG. 4A is a graph illustrating an envelope of the width-dependent scattering rate of a waveguide transition for nominal design parameters and multiple process corners, providing an upper bound on the scattering rate of the waveguide transition, in accordance with one embodiment.

DESCRIPTION

Figure 1B:
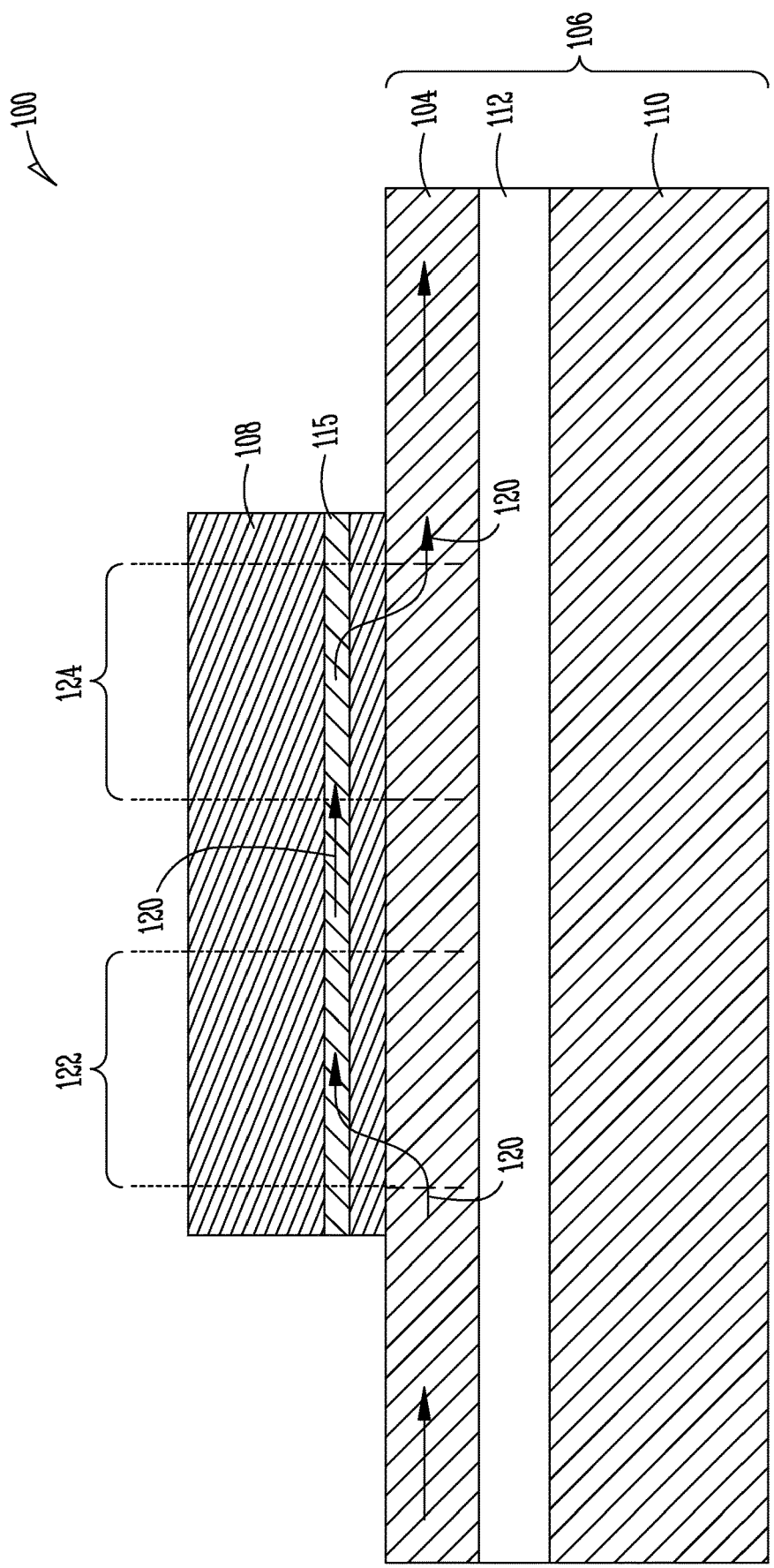

Described herein is an approach to designing optical waveguide transitions with one or more non-linear waveguide tapers that optimizes the trade-off between taper length and scattering losses. In non-linear waveguide tapers, the taper profile, herein understood as the change in waveguide width as a function of length along the waveguide taper, is non-linear. For a given change in waveguide width over a given taper length, suitable non-linear waveguide taper profiles can achieve lower losses than linear waveguide taper profiles; or, conversely, for a given limit on acceptable scattering losses, non-linear waveguide tapers can be designed shorter.

The precise taper profile that achieves optimal performance depends on the scattering rate as a function of waveguide width. The width-dependent scattering rate, in turn, depends on design parameters of the waveguide transition, such as the fabricated dimensions (e.g., layer thicknesses) and material properties (e.g., the refractive index) of the waveguide transition. Those parameters, however, are in practice subject to process variations in fabrication. Dimensional parameters prone to fabrication variation include, e.g., etch depths, alignments, and widths of lithographic process layers and material thicknesses. Further, the refractive index, which is generally defined by the materials used, may be subject to fabrication variations due to variations in material stoichiometry or stresses. A waveguide transition manufactured according to a taper profile computed based on the nominal design parameters, therefore, generally falls short of the theoretical performance. Rather than simply "stretching" the waveguide taper to compensate for any variations in the design parameters and keep the scattering losses associated with the waveguide transition below a specified acceptable limit, the proposed design approach takes the process variations into account to generate a fabrication-tolerant non-linear taper profile optimized jointly for multiple combinations of variations in the design parameters. More particularly, in various embodiments, the expected range of variations is captured in multiple sets of parameter values of the design parameters, including, e.g., a set of nominal parameter values and sets of parameter values representing the most extreme variations in design parameters that are still within acceptable margins, i.e., result in devices that still pass quality inspection (rather than being discarded); these process variation extremes are commonly referred to as "process corners."

In accordance with various embodiments, designing a fabrication-tolerant waveguide taper profile involves computing the width-dependent scattering rate for multiple sets of values of the design parameters, such as for the nominal parameter values and sets of parameters values associated with the process corners, and determining the envelope of the computed scattering rates, which represents the worst-case scattering rate for each width along the taper. The non-linear taper profile is then calculated based on the envelope. The taper profile can be straightforwardly scaled to any taper length. In some embodiments, scattering losses along the waveguide taper are simulated based on the computed taper profile for a specified taper length and for the multiple sets of design parameter values to determine an associated range of optical transmission values for the waveguide transition, the minimum transmission of the range representing the achievable performance of the waveguide transition. Further, the simulation may be performed for multiple values of the taper length (e.g., corresponding to a discretized range of lengths) to determine, for a specified threshold transmission value, how long the taper should be to exceed the threshold transmission value for all of the simulated sets of design parameter values. Once the taper profile and taper length have been determined, the waveguide transition can be fabricated in accordance with that profile, e.g., by patterning the semiconductor device layer of a substrate to form the bottom one of the two waveguides, depositing another layer of material (e.g., a III-V semiconductor material as may be used in active photonic devices) above the bottom waveguide, and patterning that top layer to form the top waveguide of the transition. The taper may be included in either one of the bottom waveguide or the top waveguide. Further, in some embodiments, both waveguides are tapered in an overlapping fashion, with profiles computed based on the envelope of scattering rates for multiple sets of design parameter values.

The foregoing will be more readily understood from the following description of the accompanying drawings, which illustrate various example embodiments and underlying principles.

Figure 1D:
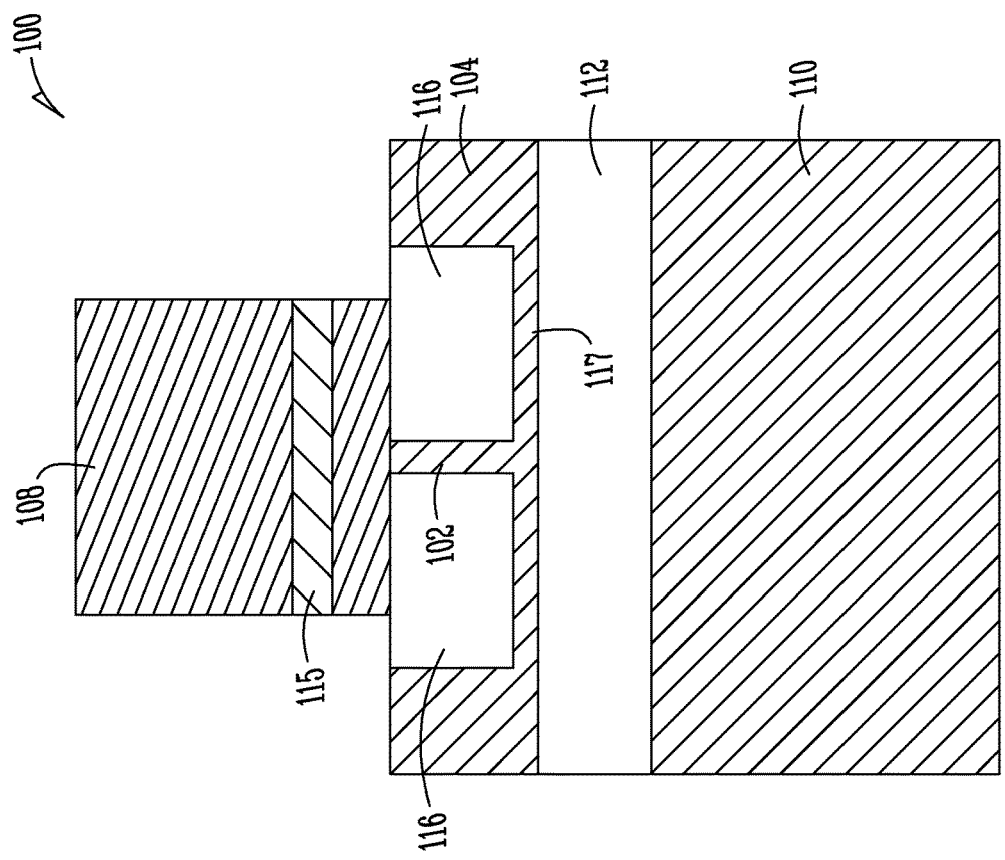
FIGS. 1C and 1D are cross-sectional views of the heterogeneous photonic structure of FIGS. 1A and 1B at two locations along the tapered waveguide transitions.
Figure 1C:
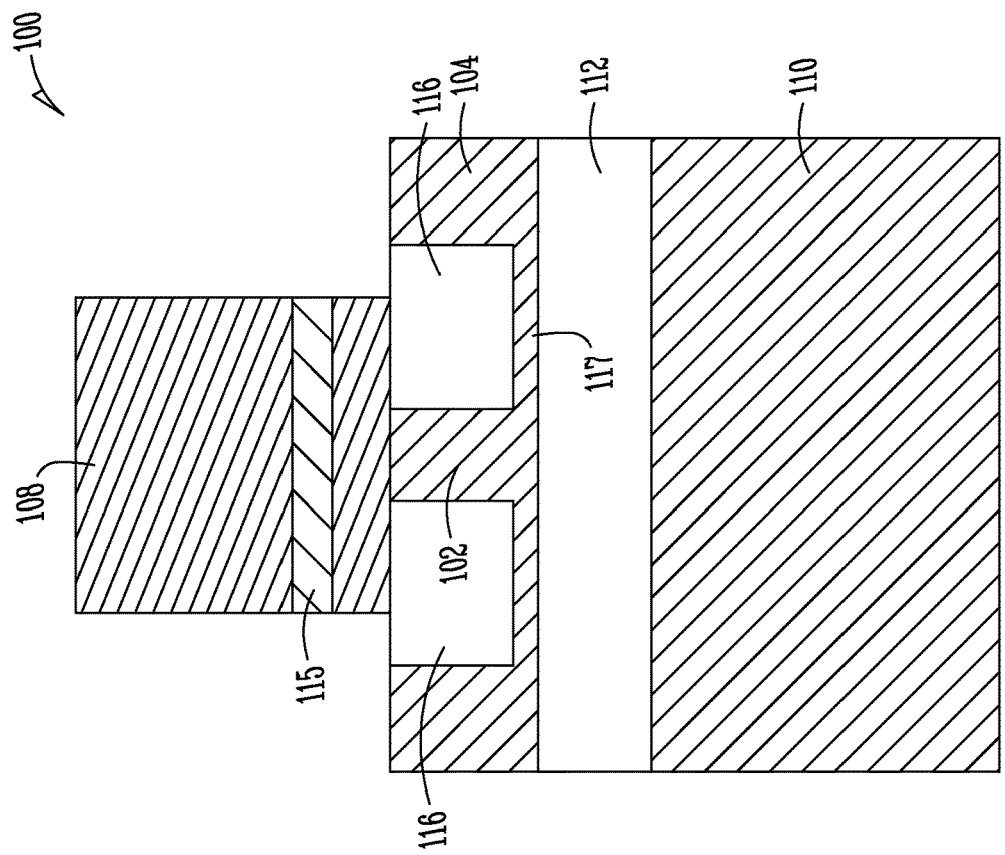

FIGS. 1A and 1B are top and side views, respectively, of an example heterogeneous photonic structure 100 including waveguide transitions with a tapered bottom waveguide 102, in accordance with various embodiments. FIGS. 1C and 1D are cross-sectional views of the heterogeneous tapered waveguide transitions of FIGS. 1A and 1B at two locations along the waveguide length. The waveguide transitions are formed between the tapered bottom waveguide 102 created in (e.g., a device layer 104 of) a substrate 106, and a top waveguide 108 formed above the substrate 106. The bottom and top waveguides 102, 108 may generally be made from any combination of light-guiding material, including semiconductor materials (such as silicon or III-V compound semiconductor material) or dielectrics. For example, the waveguide transition may include a III-V material (for the top waveguide 108) on silicon (for the bottom waveguide 102), a dielectric on silicon, a III-V material on a dielectric, a dielectric on another dielectric, etc.

In some embodiments, as can be seen in FIG. 1B, the substrate 106 is an SOI or other semiconductor-on-insulator substrate including a handle layer 110 (e.g., of silicon, diamond), a buried oxide (BOX) or other insulating layer 112 on top of the handle layer 110, and the semiconductor device layer 104 (e.g., made of silicon) on top of the insulating layer 112. The top waveguide 108 may be bonded directly to the semiconductor device layer 104, as shown, or to an optional thin bonding layer (e.g., made of silica) deposited above the semiconductor device layer 104. As shown, the top waveguide 108 may include multiple layers, including an optically active layer 115, where light can be generated or absorbed. In various embodiments, the top waveguide 108 is made of one or more III-V materials (such as, e.g., indium phosphide (InP), indium arsenide (InAs), gallium arsenide (GaAs), gallium nitride (GaN), or indium antimonide (InSb)), or alternatively of II-VI compound semiconductor materials.

The bottom waveguide 102 may be defined in the device layer 104 by channels 116 etched into the device layer 104. For a rib waveguide, as shown in FIGS. 1C and 1D, the device layer 104 is etched only partially, leaving a thin slab 117 of material (e.g., silicon), on which the rib rests. Light coupled into the bottom waveguide 102 at one end generally propagates along the bottom waveguide 102 to the other end, as indicated by arrows 118 in FIG. 1A. In a region in which the bottom and top waveguides 102, 108 overlap, the light couples at least partially from the bottom waveguide 102 up into the top waveguide 108 in a first waveguide transition, propagates to the other end of the top waveguide 108, and couples back down into the bottom waveguide 102 in a second waveguide transition, as shown by arrows 120 in FIG. 1B. To facilitate good optical coupling, the bottom waveguide 102 gradually decreases in width in the first waveguide transition at the start of the overlap region, forming a waveguide taper 122. In the second waveguide transition at the end of the overlap region, the bottom waveguide 102 tapers back up, e.g., to its original width, along a second waveguide taper 124, which may be mirror-symmetric to the first taper 122. FIG. 1C depicts the cross section at the beginning of the overlap region between the two waveguides 102, 108, where the bottom waveguide still has its maximum width. (The same cross section applies to the end of the overlap region, following the taper 124.) FIG. 1D shows a cross section near the tip of the taper 122 (or, similarly, near the tip of the taper 124). In between the tips (understood to be the narrowest ends) of the tapers 122, 124, the bottom waveguide 102 may persist as a narrow waveguide (e.g., of a small constant width), as shown, and some of the optical power may remain and be carried in that narrow strip of the bottom waveguide 102. Alternatively, the bottom waveguide 102 may taper all the way down to a point in each taper 122, 124, vanishing in between the tapers 122, 124.

Figure 2A:
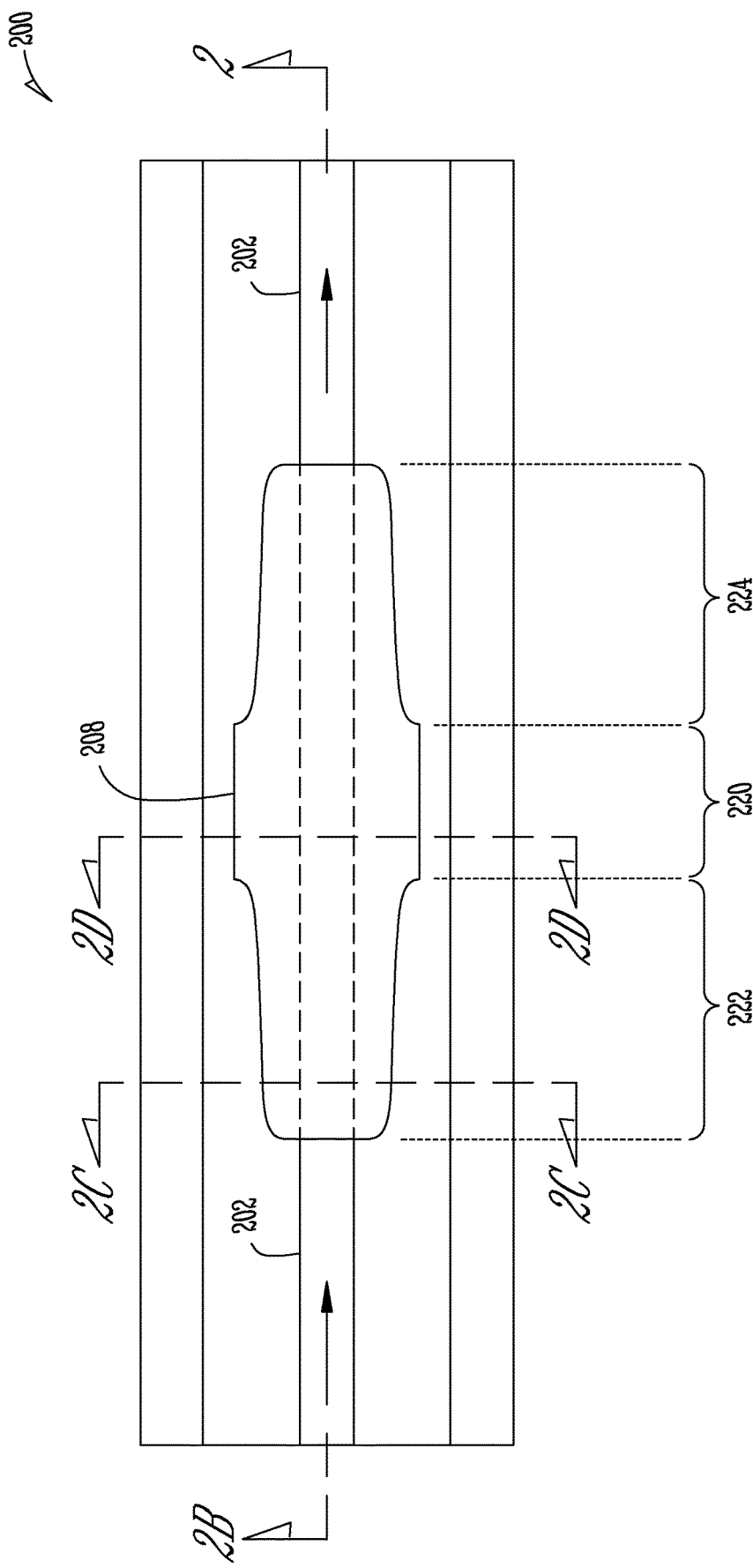
FIGS. 2A and 2B are top and side views, respectively, of an example heterogeneous photonic structure including waveguide transitions with a tapered top waveguide, in accordance with various embodiments.
Figure 2B:
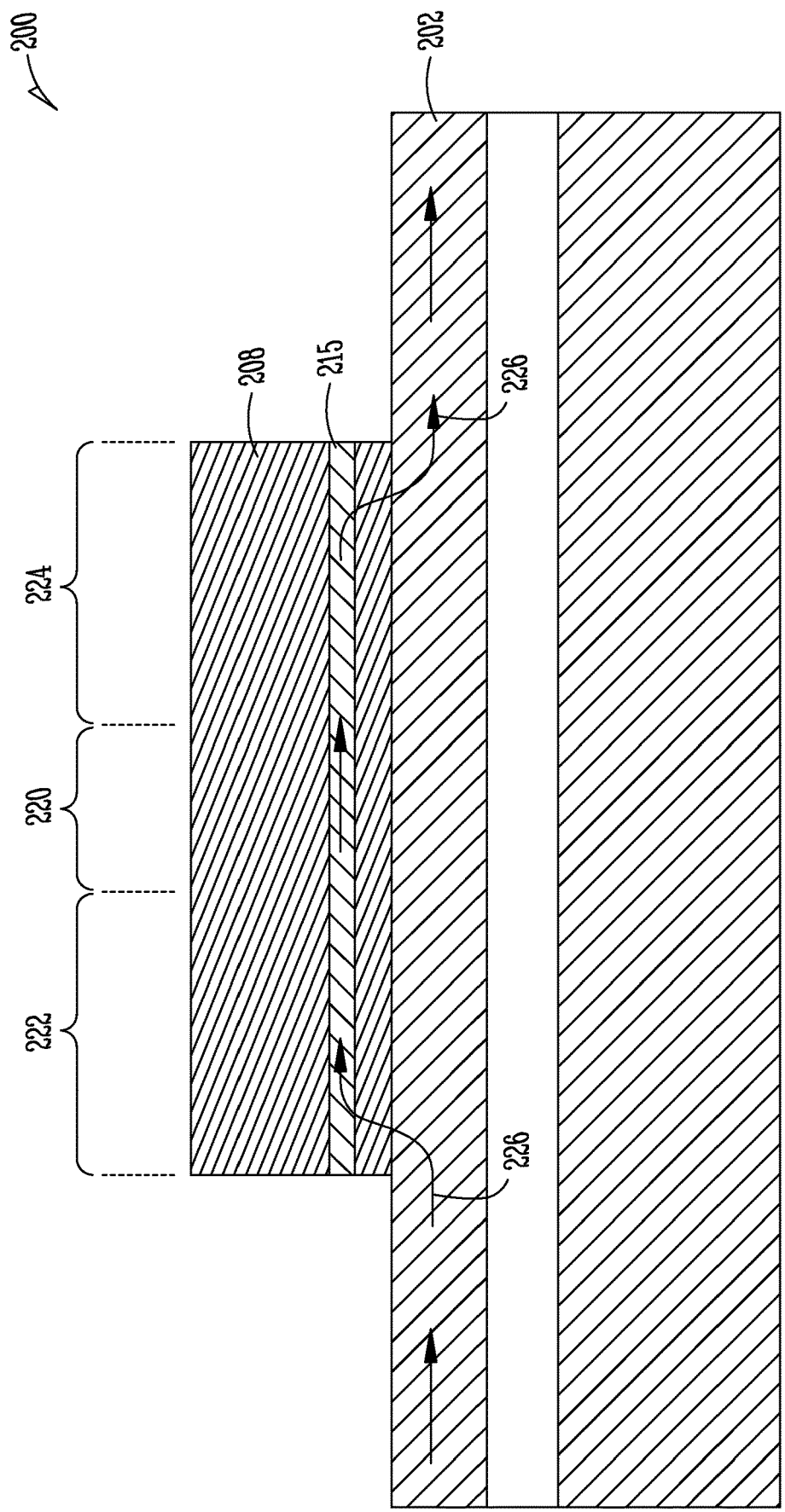
Figure 2D:
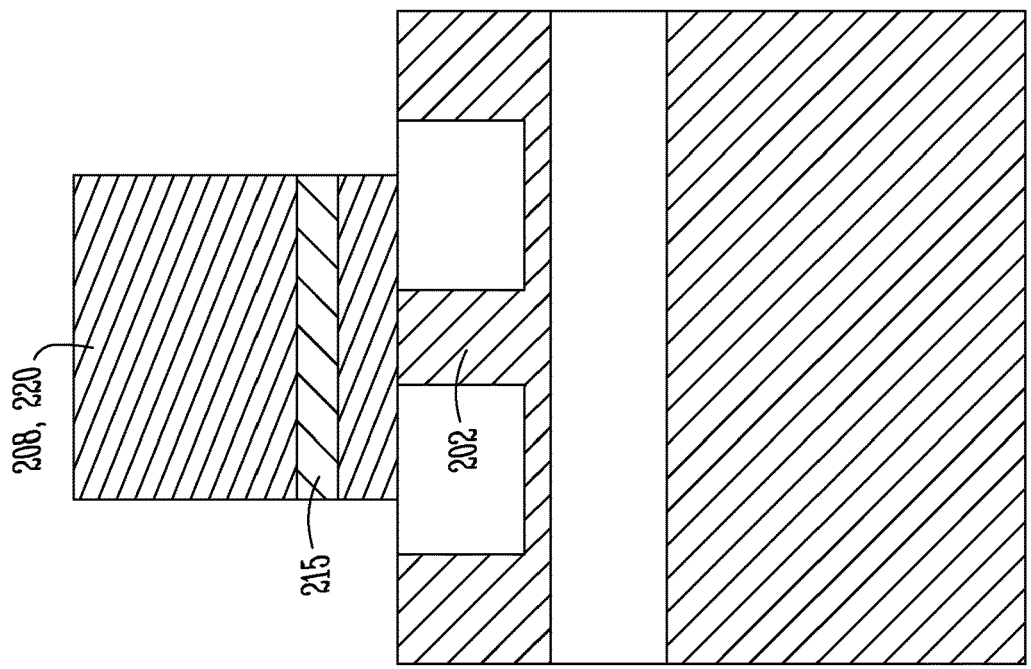
FIGS. 2C and 2D are cross-sectional views of the heterogeneous photonic structure of FIGS. 2A and 2B at two locations along the tapered waveguide transitions.
Figure 2C:
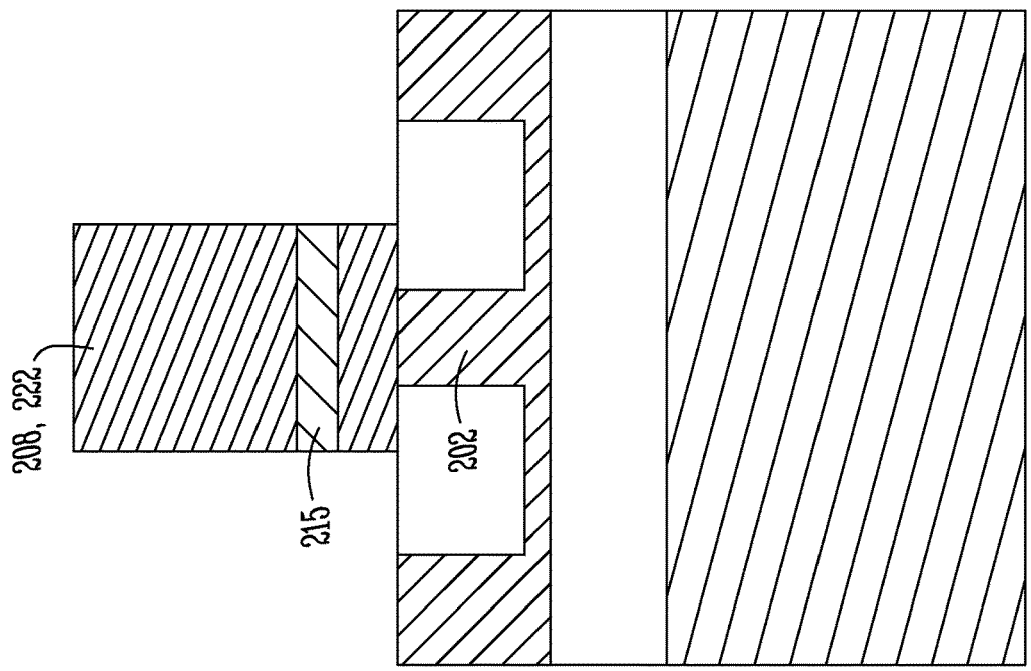

FIGS. 2A and 2B are top and side views, respectively, of an example heterogeneous photonic structure 200 including waveguide transitions with a tapered top waveguide 208, in accordance with various embodiments. FIGS. 2C and 2D are cross-sectional views of the heterogeneous photonic structure 200 of FIGS. 2A and 2B at two locations along the tapered waveguide transitions. The bottom waveguide 202 has, in this example, constant width along the overlap region between the waveguides 202, 208. The top waveguide 208 includes a center region 220 of constant width, preceded and followed by waveguide tapers 222, 224. In a first waveguide transition at the start of the overlap region between the two waveguides 202, 208, where the waveguide 208 tapers up, light is coupled from the bottom waveguide into the top waveguide 208, as shown by arrows 226 in FIG. 2B. In the center region 220, light is carried predominantly in the top waveguide 208 (although a small fraction of the optical mode may still be carried in the bottom waveguide 202). In the active layer 215 of the top waveguide, the light can be, e.g., amplified or absorbed. In a second waveguide transition at the end of the overlap region, where the top waveguide 208 tapers down, light is coupled back into the bottom waveguide 202. As can be seen in FIG. 2C, at the start of the overlap region between the two waveguides 202, 208, the top waveguide 208 is only slightly wider than the bottom waveguide 202. In the center region 220, the top waveguide 208 may be significantly wider, as shown in FIG. 2D. Apart from the location of the tapers 222, 224 in the top waveguide 208, the photonic structure 200 may be similar, e.g., in dimensions and materials, to the photonic structure 100 of FIGS. 1A-1D.

Note that, in FIG. 2A, the waveguide tapers 222, 224 are shown with non-linear taper profiles; that is, the width of the top waveguide 208 varies non-linearly with position in the longitudinal direction along the waveguide. By contrast, FIG. 1A shows, for illustration purposes only, linear waveguide tapers 122, 124 in the bottom waveguide 102. In accordance with various embodiments, waveguide transitions are designed to have non-linear tapers, regardless of the waveguide (i.e., top or bottom waveguide) that includes the taper.

While FIGS. 1A-2D depict photonic structures with tapered waveguide transitions on both ends, as may be used, e.g., to couple light into and out of a heterogeneously implemented optical modulator (e.g., an electro-absorption modulator) or amplifier, the embodiments contemplated herein also encompass heterogeneous photonic structures that include only a single waveguide transition, e.g., to couple light at the input or output of a photonic circuit from or to a photonic device such as a laser or photodetector. Also, to the extent a photonic structure includes two waveguide transitions, they need not necessarily be symmetric, or even both be tapered. Further, although the use of waveguide transitions has been described in the context of heterogeneous integration of different materials, the principles for designing and making tapered waveguide transitions also apply to transitions between two waveguides of the same material, e.g., two silicon waveguides in adjacent waveguide layers of a multi-layer photonic circuit.

Moreover, while FIGS. 1A-2D illustrate waveguide tapers in either the top or the bottom waveguide, waveguide transitions may also, in accordance with other embodiments, include tapers in both the top waveguide and the bottom waveguide, e.g., arranged in an overlapping fashion such that one of the tapers increases in width as the other one decreases in width. In the following, it will be explained how the taper profile can be optimized for the structure of the waveguide transition to achieve good coupling between the waveguides and minimize scattering losses. While this description assumes only one of the waveguides to be tapered, those of ordinary skill in the art will know how to adapt the design methods to waveguide transitions with two overlapping tapers.

A waveguide transition usually serves to couple light from the fundamental optical mode of one waveguide to the fundamental optical mode of the other waveguide. In the transition region, a fundamental hybrid mode, or "supermode," across both waveguides emerges. However, the fundamental hybrid mode can excite undesired higher-order hybrid modes as a result of spatial overlap between the modes. This coupling of light into the undesired higher-order hybrid modes amounts to scattering losses along the waveguide transition. The losses can be predicted by computing the overlap integral between the fundamental and higher-order hybrid modes, in this context called the "scattering rate" S:

$$S = \frac{\langle E0 | Ei \rangle}{\Delta n_{e\!f\!f}},$$

where E0 is the fundamental hybrid mode, Ei is the i-th higher-order mode, and $\Delta n_{e\!f\!f}$ is the effective index difference of the combined waveguide structure between the fundamental and i-th higher-order mode. The calculation can, in principle, iterate over multiple higher-order modes of increasing order (i=1, 2, . . . ), and the contributions of all of those higher-order modes can be summed over to determine the total scattering rate. In practice, however, it is often sufficient to compute losses only for the first-order mode (i=1), or the first few higher-order modes, as the overlap between the fundamental mode and the higher-order modes diminishes quickly, and the effective index difference increases, towards increasing order i, such that loss contributions beyond that of the first or first few higher orders become negligible.

The waveguide modes can be computed from the cross-sectional waveguide structure, e.g., using a numerical waveguide mode solver. Mode solvers are well-known in the art and provided as part of various commercially available software packages, including, e.g., Matlab from MathWorks, or the DEVICE Multiphysics Simulation Suite from Ansys-Lumerical. In a tapered waveguide transition, the cross-sectional structure at each point along the length of the waveguide can be characterized by the waveguide width at that point, in conjunction with other dimensions as well as material properties that are constant along the waveguide.

Figure 3:
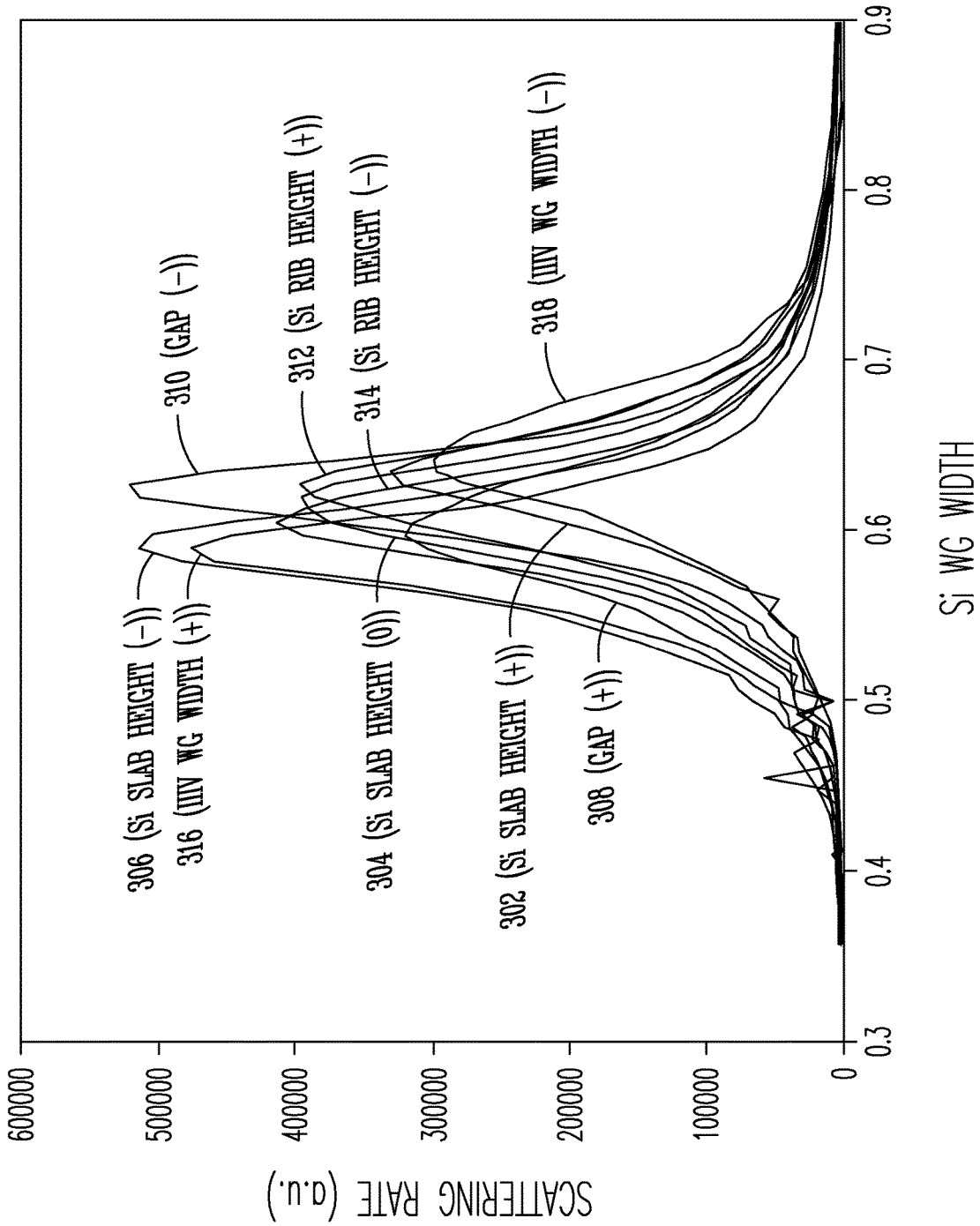
FIG. 3 is an example graph illustrating the width-dependent scattering rate of a waveguide transition for nominal design parameters and multiple process corners in accordance with one embodiment.

FIG. 3 is an example graph 300 illustrating the width-dependent scattering rate of a waveguide transition for nominal design parameters and multiple process corners in accordance with one embodiment. In this example, the waveguide transition is between a tapered silicon rib waveguide and a III-V waveguide. The silicon waveguide width measured in micrometers is shown along the abscissa (or x-axis), and the scattering rate is provided in arbitrary units along the ordinate (or y-axis). Curve 304 is the scattering rate computed for the nominal design parameters. Curves 302 and 306 illustrate the scattering rate for process corners corresponding to an increase or decrease, respectively, of the layer height of the silicon slab underneath the rib (e.g., slab 117 in FIG. 1C); as can be seen, a thinner slab causes a significant increase in the scattering rate. Curves 308, 310 show the scattering rate for process corners associated with an increase or decrease, respectively, of the gap between the silicon rib waveguide and the III-V waveguide, that is, the thickness of any bonding layer and/or insulating layer underneath the III-V waveguide; a decrease in the gap likewise increases the scattering rate. As shown in curves 312, 314, which illustrate the scattering rate for process corners associated with an increase or decrease, respectively, in the height of the silicon waveguide rib, this design parameter shifts the curve slightly, but affects the magnitude of the scattering rate to a lesser extent. Curves 316, 318, corresponding to the scattering rate for process corners associated with an increase or decrease, respectively, of the width of the III-V waveguide, show a substantial increase of the scattering rate with increased width. In general, design parameters that may affect the scattering rate at a waveguide transition include, for example and without limitation, the waveguide widths of the bottom and/or top waveguide, the etch depth of a bottom and/or top rib waveguide, the thickness of the bottom and/or top waveguide, the refractive index of the top and/or bottom waveguide, the distance between the bottom and/or top waveguide (e.g., as is driven by the insulated-layer thickness), and the lateral misalignment between the bottom and top waveguides.

The scattering loss incurred along a waveguide taper for a given width increment dw is proportional to the width gradient dw/dz along the length z of the waveguide as well as the width-dependent scattering rate S(w). For a given total change in width Δw and a given taper length L, the lowest possible scattering losses can be achieved by choosing a gradient as a function of width that is inversely proportional to the scattering rate $$\frac{dw}{dz}(w) = \frac{1}{S(w)}$$

(or, equivalently, $$S(w) = \frac{dz}{dw}(w)\bigg).$$

With this taper profile, the total change in width and the taper length are related according to:

$$L = \int_{w0}^{w0+\Delta w} \frac{dz}{dw} dw = \int_{w0}^{w0+\Delta w} S(w)dw.$$

As illustrated in FIG. 3, however, the scattering rate S(w), although determinable for a given waveguide transition design, varies significantly with changes in the design parameters. In accordance with various embodiments, these variations are taken into account when computing the waveguide taper profile.

FIG. 4A is a graph 400 illustrating an envelope 401 of the width-dependent scattering rate of a waveguide transition for nominal design parameters and multiple process corners, providing an upper bound on the scattering rate of the waveguide transition, in accordance with one embodiment. Similarly to FIG. 3, graph 400 illustrates the width-dependent scattering rate S(w) associated with a waveguide transition between a tapered silicon rib waveguide and a III-V waveguide for multiple process cases, including for a set of nominal parameter values (curve 404) as well as a set of parameter values associated with various process corners. The process corners correspond to lower and upper bounds on the gap between the two waveguides (curves 402, 406), the index of refraction of the III-V waveguide (curves 408, 410), the height of the rib waveguide (curves 412, 414), and the height of the silicon slab (curves 416, 418). The envelope 401, as the term is used herein (not in the strict geometric sense of "envelope," although similar in nature), is a curve that provides an upper bound to all process cases collectively by determining, at each waveguide width, the maximum scattering rate across all process corners and linearly interpolating between local maxima across waveguide width. As such, the envelope captures the worst-case scattering scenario across the range of all fabrication variations within acceptable margins. In accordance with various embodiments, the taper profile is computed based on the envelope 401 of the scattering rates, rather than based on the scattering rate for nominal design parameter values (or any other particular set of values).

Note that, in the depicted case, only one design parameter at a time is varied. To strictly account for all fabrication variations, computations of the scattering rate for cases where two or more design parameters vary simultaneously from the nominal values may also be included. Such cases will, however, be rarely encountered in practice, and accounting for them explicitly is, thus, usually unnecessary. Instead, by taking a linear-interpolation envelope, the design will effectively also be tolerant to simultaneous medium variations in multiple parameters. The adequacy of the envelope can be tested, e.g., with Monte-Carlo simulations for a set of design parameter variations chosen from known statistics of the design parameter variations in fabrication, which could provide assurance that a satisfactory number of scattering rates fall within the envelope. Alternatively, the adequacy of the envelope can be implicitly validated by simulations performed on the final taper design, as explained below with reference to FIG. 5.

Figure 4B:
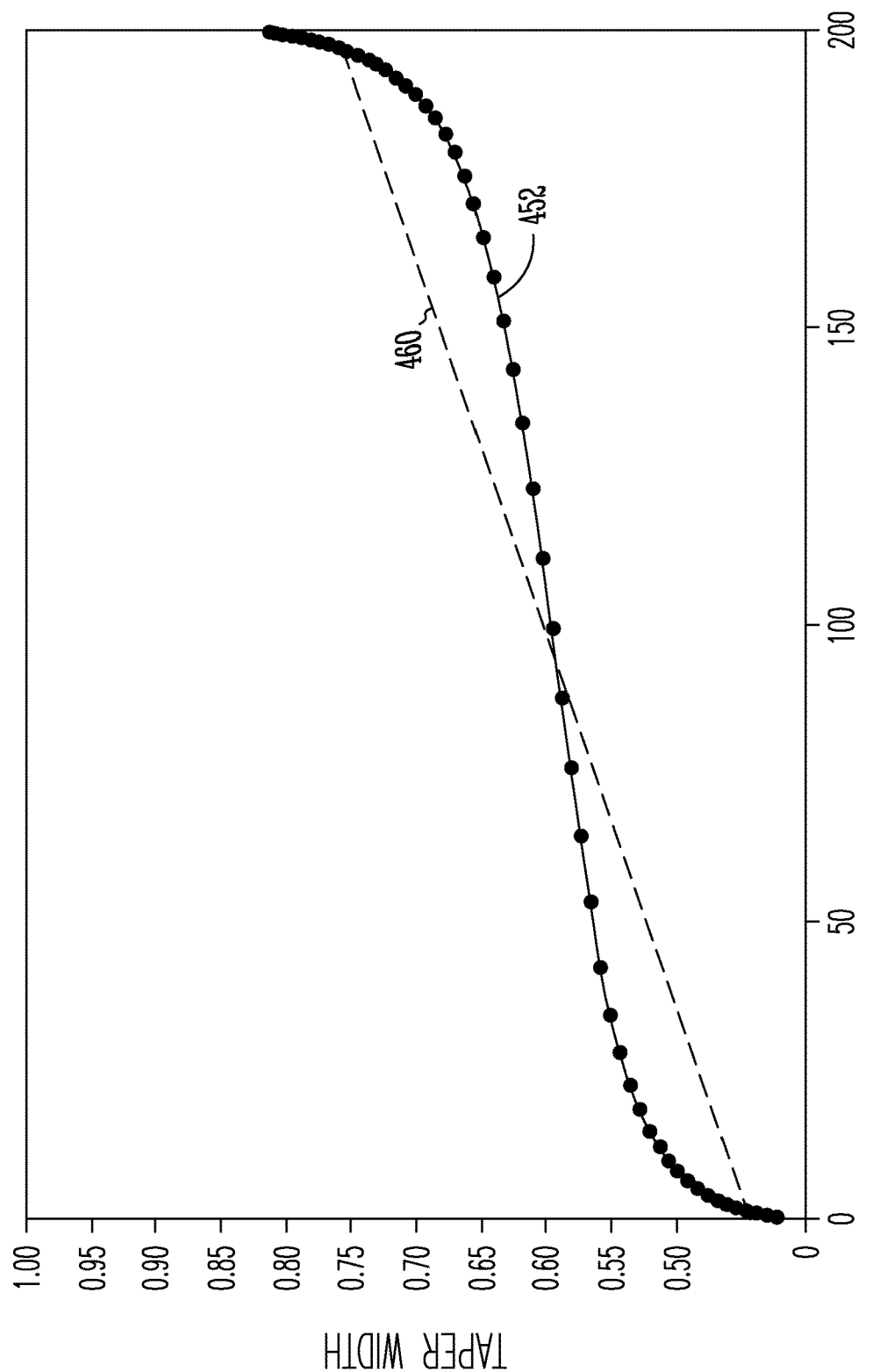
FIG. 4B is a graph of a non-linear waveguide taper profile determined based on the envelope shown in FIG. 4A, in accordance with one embodiment.

FIG. 4B is a graph 450 showing a non-linear waveguide taper profile 452 determined based on the envelope 401 shown in FIG. 4A, in accordance with one embodiment. For comparison, a linear taper profile 460 is also shown. The taper width in micrometers, plotted as a function position z along the longitudinal axis of the taper (in arbitrary units), increases from about 0.45 μm to about 0.75 μm; FIG. 4A indicates this width range with the dashed line 430. The non-linear profile exhibits steep gradients, corresponding to a sharp increase in width, at the beginning and end of the taper, where the scattering rate is low, while the width varies slowly in the middle of the taper, where the scattering rate is high. The very gradual change in width over most of the length of the taper balances the high scattering rate at medium taper widths, which can improve overall performance.

While the foregoing description refers to waveguide transitions including a taper in either the bottom or the top waveguide, the taper design method can be straightforwardly extended to transitions between two tapered waveguides. To do so, the scattering rate may be computed as a function of the widths of both waveguides (e.g., silicon width and III-V width), resulting, for each set of design parameters, in a contour map or other three-dimensional representation (with scattering rate along the z-axis vs. waveguide widths along the x- and y-axes). Multiple such contour plots for multiple respective sets of design parameters (e.g., for the nominal design and multiple process corners) will take the place of the two-dimensional curves of FIG. 3. An envelope Z(x, y) can be defined over the contour plots. A single line y=f(x) in the x-y plane spanned by the two waveguide widths, representing a particular combined taper design for the top and bottom waveguides, may then be determined so as to minimize the envelope area under Z(x, f(x)).

Figure 5:
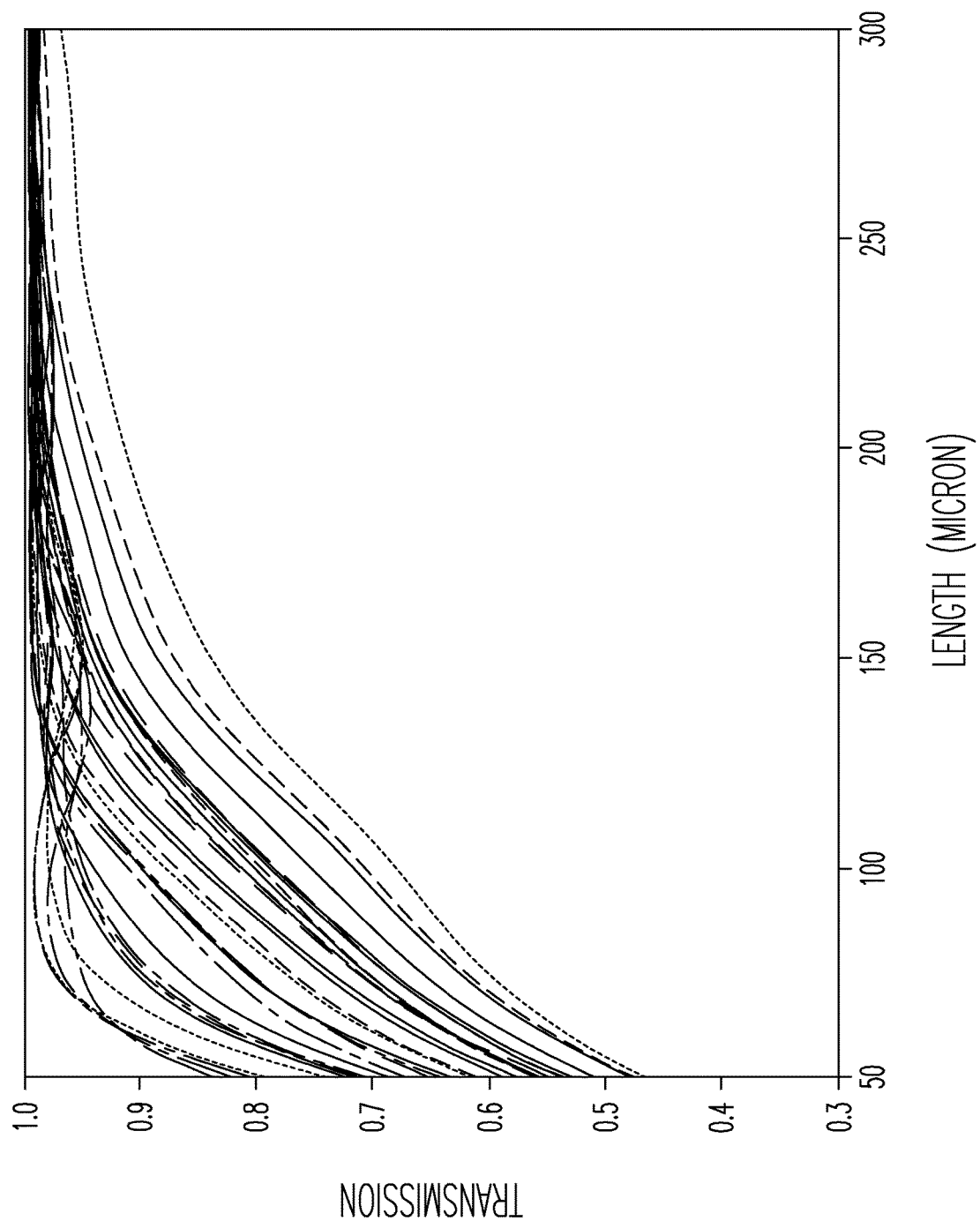
FIG. 5 is a graph illustrating the simulated transmission of a tapered waveguide transition as a function of taper length for multiple process corners, in accordance with one embodiment.

FIG. 5 is a graph 500 illustrating the simulated transmission of a tapered waveguide transition as a function of taper length for multiple process corners, in accordance with one embodiment. The taper length is indicated along the abscissa in micrometers. Along the ordinate, the transmission of the waveguide transition, which measures the fraction of optical power that is coupled from the fundamental mode of one waveguide into the fundamental mode of the other, is provided. The different curves correspond to different process cases that reflect a range of values of the design parameters, but are all computed for the same non-linear taper profile (such as the profile 452 shown in FIG. 4B), scaled to the respective total taper length for each point along each curve. The simulations can be performed, e.g., with the beam propagation method (BPM), eigen-mode expansion (EME), or finite-element time domain (FDTD) method, which are techniques, well-known to those of ordinary skill in the art, that simulate the propagation of light in slowly varying optical waveguides. The family of curves shown in graph 500 may be used to determine, for a specified length of the taper, the minimum of the transmission across the range of simulated cases, which provides a lower bound below which transmission is, in practice, unlikely to fall. In other words, the simulations allow specifying a virtually guaranteed transmission performance for a waveguide transition having the computed taper profile and specified length. Conversely, it is possible to specify a threshold transmission value, and read off the length that the taper should have to ensure that the transmission exceeds the threshold for all expected process variations. For example, with reference to FIG. 5, to achieve a transmission of about 80% or higher, the waveguide should have a length of about 150 μm or more.

Figure 6:
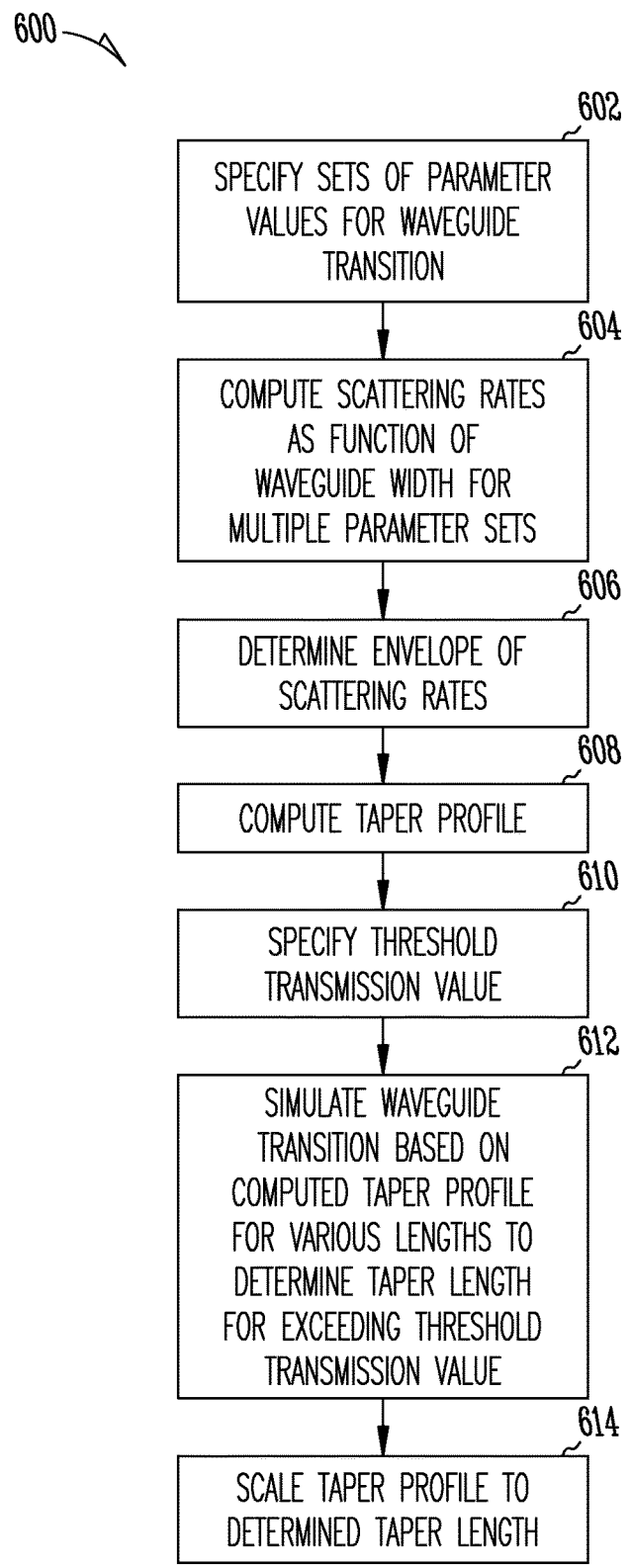
FIG. 6 is a flow chart of a method for designing a heterogeneous waveguide transition with a fabrication-tolerant non-linear waveguide taper, in accordance with various embodiments.

FIG. 6 is a flow chart of a method 600 for designing a heterogeneous waveguide transition with a fabrication-tolerant non-linear waveguide taper, in accordance with various embodiments. The method 600 begins, in act 602, with the specification of multiple sets of parameter values for parameters characterizing the waveguide transition, such as layer thicknesses, waveguide dimensions, and waveguide materials and/or material properties (e.g., the refractive index). One set of parameter values may correspond to the nominal waveguide transition design. The other sets of parameter values capture expected fabrication variations from the nominal values, e.g., the process corners (corresponding to the extremes of the variations at the outer limits of the tolerance margins). In act 604, the scattering rate as a function of waveguide width is computed for each of the multiple sets of parameter values. This computation may be performed, e.g., by a computer using software such as, or including, a mode solver, based on the parameter values received as input in act 602. The parameter values may, e.g., be provided to the computer by a human operator via a user interface, or read in from a design file stored in memory. Once the waveguide-width-dependent scattering rate has been computed for all sets of parameter values, their envelope (e.g., as shown in FIG. 4A) is determined in act 606. This step will generally be performed automatically based on suitable program instructions (although it could, in principle, also be done manually by the user). From the envelope, a taper profile (arbitrarily scaled) is then computed in act 608. Optionally, a threshold transmission value may be specified in act 610, e.g., by the user, and the minimum taper length meeting the condition that the transmission exceeds the threshold value may be determined in act 612 by simulating the taper based on the computed taper profile for various lengths (e.g., as shown in FIG. 5) with suitable simulation software, and identifying the lower taper-length cut-off associated with the desired transmission. The taper profile can then be scaled to the determined taper length (act 614), which completes the taper design process.

Figure 7:
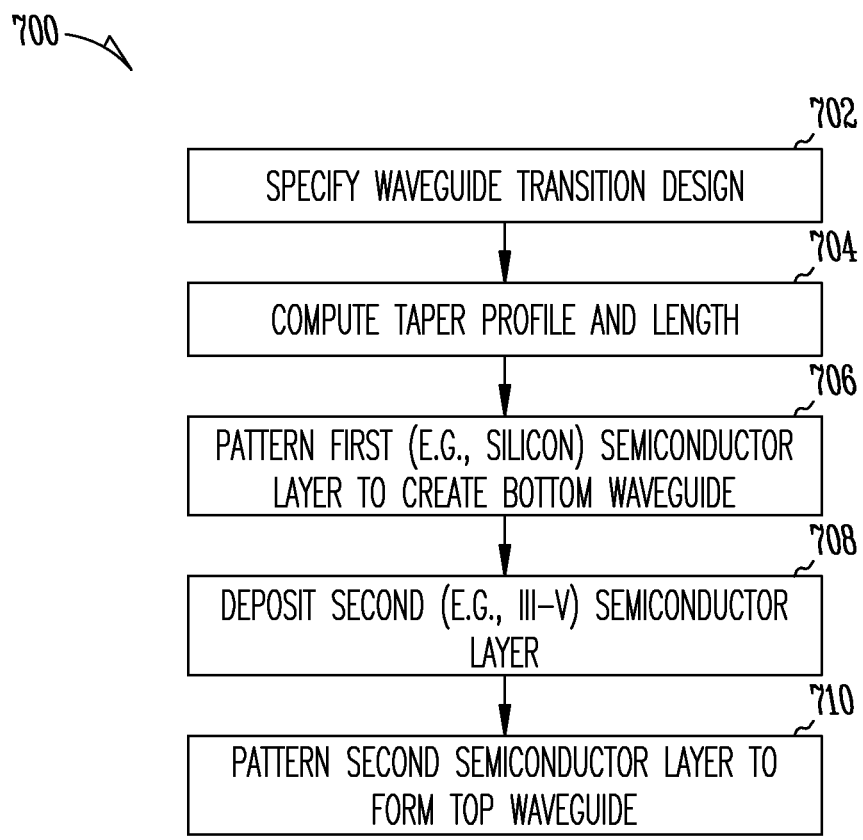
FIG. 7 is a flow chart of a method of making a heterogeneous waveguide transition with a fabrication-tolerant non-linear waveguide taper, in accordance with various embodiments.

FIG. 7 is a flow chart of a method 700 of making a heterogeneous waveguide transition with a fabrication-tolerant non-linear waveguide taper, in accordance with various embodiments. The method 700 begins by specifying the general design of the waveguide transition in act 702 (e.g., corresponding to the nominal parameter values provided in act 602 of method 600), and determining the taper profile and length, in act 704, in accordance with acts 602-614 of method 600. To make the waveguide transition, a semiconductor device layer, such as the silicon device layer of an SOI substrate, is first patterned to form the first waveguide of the transition in act 706. Next, a second semiconductor layer, e.g., of III-V material or another compound semiconductor, is deposited above the patterned first layer in act 708. For example, a III-V die may be bonded to the silicon or other semiconductor device layer in the region above the first waveguide. In act 710, the second semiconductor layer is patterned to form the second waveguide. The patterning of the first and second layers is done in accordance with relevant parameters of the design specified in act 702 (e.g., waveguide widths), and either the first or the second semiconductor layer is patterned based on the computed taper profile, depending on which of the two waveguides is to be tapered. In some embodiments, overlapping tapers are created based on computed taper profiles for both waveguides. The patterning in acts 706, 710 may be performed using conventional lithographic patterning, followed by etching and related processing steps (such as applying an oxide fill to the patterned device layer prior to bonding the die).

Figure 8:
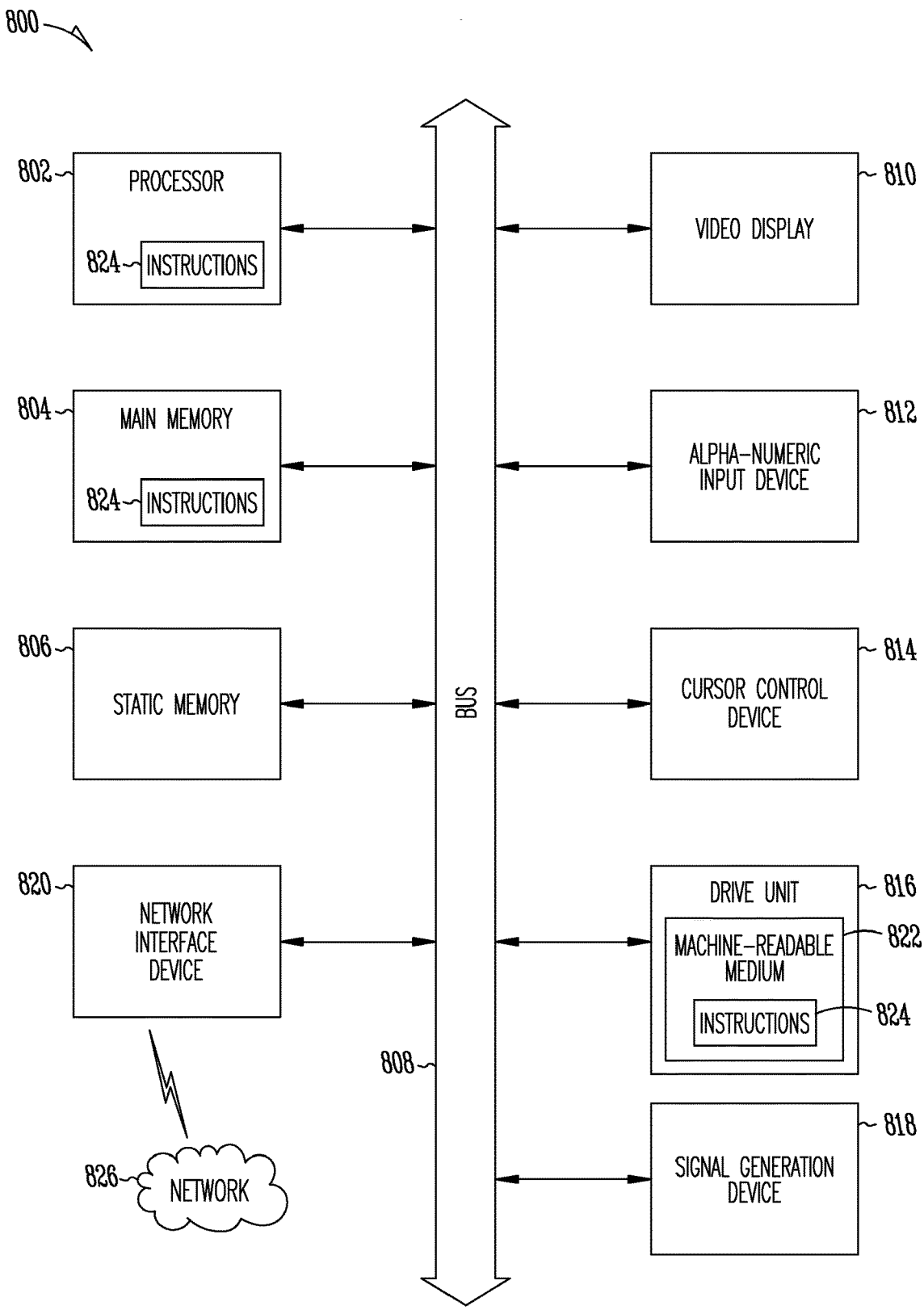
FIG. 8 is a block diagram of a computer system for performing operations implementing the method of FIG. 7, in accordance with various embodiments.

FIG. 8 is a block diagram of a computer system 800 for performing operations implementing the method of FIG. 6, in accordance with various embodiments. In alternative embodiments, the machine may operate as a single, standalone device, or may be connected (e.g., networked) to other machines. In a networked deployment, the machine may operate in the capacity of a server or a client machine in server-client network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the computational operations discussed herein. The example computer system 800 includes one or more processors 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 may also include an alphanumeric input device 812 (e.g., a keyboard), a cursor control device 814 (e.g., a mouse), a disk drive unit 816, a signal generation device 818 (e.g., a speaker), and a network interface device 820 to communicate via a network 826.

The disk drive unit 816 includes a machine-readable medium 822 storing one or more sets of instructions and data structures (e.g., software) 824 embodying or utilized by any one or more of the methodologies or functions described herein. The instructions 824 may also reside, completely or at least partially, within the main memory 804 and/or within the processor 802 during execution of the instructions 824 by the computer system 800, the main memory 804 and the processor 802 thereby also constituting machine-readable media. The sets of instructions may include, for example, a mode solver, a simulation program to simulate light propagation along and coupling between the waveguides of the waveguide transition, and/or a main program configured to receive the parameters characterizing the waveguide transition design and process corners, and determine the taper profile and length, using the mode solver and simulation program.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; CD-ROM and DVD-ROM disks, or other data-storage devices.

The following numbered examples are illustrative embodiments:

1. A method of making a waveguide transition between two waveguides, the waveguide transition comprising a waveguide taper, the method comprising: specifying multiple sets of parameter values for parameters characterizing the waveguide transition; computing a scattering rate as a function of waveguide width of the waveguide taper for each of the multiple sets of parameter values; determining an envelope of the scattering rates for the multiple sets of parameter values; computing a non-linear taper profile of the waveguide taper based on the envelope; and fabricating the waveguide transition based on the computed non-linear taper profile.

2. The method of example 1, wherein the multiple sets of parameter values comprise a set of nominal parameter values and a set of parameter values associated with process corners representing process variations from the nominal parameter values.

3. The method of example 1 or example 2, further comprising computationally simulating scattering losses along the waveguide taper based on the computed non-linear taper profile for the multiple sets of parameter values and for one or more taper lengths to compute transmission values associated with the waveguide transition.

4. The method of example 3, further comprising determining, for a specified taper length, a minimum transmission value of the computed transmission values.

5. The method of example 3, wherein the transmission values are computed for multiple taper lengths, the method further comprising selecting a taper length for fabrication of the waveguide transition based on a specified threshold transmission value in conjunction with the transmission values computed for the multiple taper lengths.

6. The method of example 5, wherein the selected taper length corresponds to a minimum of those of the multiple taper lengths at which the computed transmission values exceed the specified threshold transmission value.

7. The method of any of examples 1-6, wherein the two waveguides of the waveguide transition each comprise a waveguide taper, wherein the scattering rate is computed as a function of the waveguide widths of both waveguide tapers for each of the multiple sets of parameter values, wherein non-linear taper profiles are computed for both waveguide tapers based on the envelope; and wherein the waveguide transition is fabricated based on both computed non-linear taper profiles.

8. The method of any of examples 1-7, wherein fabricating the waveguide transition based on the computed non-linear taper profile comprises: patterning a first semiconductor layer to form a first one of the two waveguides; depositing a second semiconductor layer above the first semiconductor layer; and patterning a second semiconductor to form a second one of the two waveguides, wherein one of the first semiconductor layer or the second semiconductor layer is patterned to form a waveguide taper having the non-linear taper profile.

9. The method of example 8, wherein the first semiconductor layer is a silicon device layer of a silicon-on-insulator substrate.

10. The method of example 9, wherein the second semiconductor layer comprises a III-V compound semiconductor material.

11. A non-transitory computer-readable medium storing processor-executable instructions for designing a waveguide taper for a waveguide transition between two waveguides, the instructions, when executed by one or more hardware processors, causing the one or more hardware processors to perform operations comprising: obtaining a scattering rate as a function of waveguide width of the waveguide taper for each of multiple sets of parameter values for parameters characterizing the waveguide transition; determining an envelope of the scattering rates for the multiple sets of parameter values; and computing a non-linear taper profile based on the envelope.

12. The computer-readable medium of example 11, wherein the multiple sets of parameter values comprise a set of nominal parameter values and a set of parameter values associated with process corners representing process variations from the nominal parameter values.

13. The computer-readable medium of example 11 or example 12, the operations further comprising computationally simulating light propagation and coupling along the waveguide transition based on the computed non-linear taper profile for the multiple sets of parameter values and for one or more taper lengths to compute transmission values associated with the waveguide transition.

14. The computer-readable medium of example 13, the operations further comprising determining, for a specified taper length, a minimum transmission value of the computed transmission values.

15. The computer-readable medium of example 13, wherein the transmission values are computed for multiple taper lengths, the operations further comprising identifying a minimum taper length among those of the multiple taper lengths at which the computed transmission values exceed a specified threshold transmission value.

16. The computer-readable medium of any of examples 11-15, wherein the two waveguides of the waveguide transition each comprise a waveguide taper, wherein the scattering rate is computed as a function of the waveguide widths of both waveguide tapers for each of the multiple sets of parameter values, and wherein non-linear taper profiles are computed for both waveguide tapers based on the envelope.

17. The computer-readable medium of any of examples 11-16, the operations further comprising using a mode solver to compute the scattering rate as a function of waveguide width of the waveguide taper for each of multiple sets of parameter values.

18. A waveguide transition comprising: a bottom waveguide formed in a first semiconductor layer; a top waveguide formed in a second semiconductor layer disposed above the first semiconductor layer, the top waveguide overlapping with the bottom waveguide in an overlap region, wherein the waveguide transition is characterized by sets of parameter values for a nominal design and for process corners representing process variations from the nominal design, and wherein at least one of the bottom waveguide or the top waveguide is tapered in the overlap region in accordance with a non-linear taper profile determined from the sets of parameter values by computing a scattering rate as a function of waveguide width of the waveguide taper for each of the sets of parameter values, determining an envelope of the scattering rates for the sets of parameter values; and computing the non-linear taper profile based on the envelope.

19. The waveguide transition of example 18, wherein the bottom waveguide is a silicon waveguide and the top waveguide is a III-V waveguide.

20. The waveguide transition of example 18 or example 19, wherein the bottom waveguide is tapered in accordance with the non-linear taper profile.

Although the inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

What is claimed is:

1. A method of making a waveguide transition between two waveguides, the waveguide transition comprising a waveguide taper, the method comprising:
   specifying multiple sets of parameter values for parameters characterizing the waveguide transition;
   computing a scattering rate as a function of waveguide width of the waveguide taper for each of the multiple sets of parameter values;
   determining an envelope of the scattering rates for the multiple sets of parameter values;
   computing a non-linear taper profile of the waveguide taper based on the envelope; and
   fabricating the waveguide transition based on the computed non-linear taper profile.

2. The method of claim 1, wherein the multiple sets of parameter values comprise a set of nominal parameter values and a set of parameter values associated with process corners representing process variations from the nominal parameter values.

3. The method of claim 1, further comprising computationally simulating scattering losses along the waveguide taper based on the computed non-linear taper profile for the multiple sets of parameter values and for one or more taper lengths to compute transmission values associated with the waveguide transition.

4. The method of claim 3, further comprising determining, for a specified taper length, a minimum transmission value of the computed transmission values.

5. The method of claim 3, wherein the transmission values are computed for multiple taper lengths, the method further comprising selecting a taper length for fabrication of the waveguide transition based on a specified threshold transmission value in conjunction with the transmission values computed for the multiple taper lengths.

6. The method of claim 5, wherein the selected taper length corresponds to a minimum of those of the multiple taper lengths at which the computed transmission values exceed the specified threshold transmission value.

7. The method of claim 1, wherein the two waveguides of the waveguide transition each comprise a waveguide taper, wherein the scattering rate is computed as a function of the waveguide widths of both waveguide tapers for each of the multiple sets of parameter values, wherein non-linear taper profiles are computed for both waveguide tapers based on the envelope; and wherein the waveguide transition is fabricated based on both computed non-linear taper profiles.

8. The method of claim 1, wherein fabricating the waveguide transition based on the computed non-linear taper profile comprises:
   patterning a first semiconductor layer to form a first one of the two waveguides;
   depositing a second semiconductor layer above the first semiconductor layer; and
   patterning a second semiconductor to form a second one of the two waveguides,
   wherein one of the first semiconductor layer or the second semiconductor layer is patterned to form a waveguide taper having the non-linear taper profile.

9. The method of claim 8, wherein the first semiconductor layer is a silicon device layer of a silicon-on-insulator substrate.

10. The method of claim 9, wherein the second semiconductor layer comprises a III-V compound semiconductor material.

11. A non-transitory computer-readable medium storing processor-executable instructions for designing a waveguide taper for a waveguide transition between two waveguides, the instructions, when executed by one or more hardware processors, causing the one or more hardware processors to perform operations comprising:
   obtaining a scattering rate as a function of waveguide width of the waveguide taper for each of multiple sets of parameter values for parameters characterizing the waveguide transition;
   determining an envelope of the scattering rates for the multiple sets of parameter values; and
   computing a non-linear taper profile based on the envelope.

12. The computer-readable medium of claim 11, wherein the multiple sets of parameter values comprise a set of nominal parameter values and a set of parameter values associated with process corners representing process variations from the nominal parameter values.

13. The computer-readable medium of claim 11, the operations further comprising computationally simulating light propagation and coupling along the waveguide transition based on the computed non-linear taper profile for the multiple sets of parameter values and for one or more taper lengths to compute transmission values associated with the waveguide transition.

14. The computer-readable medium of claim 13, the operations further comprising determining, for a specified taper length, a minimum transmission value of the computed transmission values.

15. The computer-readable medium of claim 13, wherein the transmission values are computed for multiple taper lengths, the operations further comprising identifying a minimum taper length among those of the multiple taper lengths at which the computed transmission values exceed a specified threshold transmission value.

16. The computer-readable medium of claim 11, wherein the two waveguides of the waveguide transition each comprise a waveguide taper, wherein the scattering rate is computed as a function of the waveguide widths of both waveguide tapers for each of the multiple sets of parameter values, and wherein non-linear taper profiles are computed for both waveguide tapers based on the envelope.

17. The computer-readable medium of claim 11, the operations further comprising using a mode solver to compute the scattering rate as a function of waveguide width of the waveguide taper for each of multiple sets of parameter values.

18. A waveguide transition comprising:
a bottom waveguide formed in a first semiconductor layer;
a top waveguide formed in a second semiconductor layer disposed above the first semiconductor layer, the top waveguide overlapping with the bottom waveguide in an overlap region,
wherein the waveguide transition is characterized by sets of parameter values for a nominal design and for process corners representing process variations from the nominal design, and
wherein at least one of the bottom waveguide or the top waveguide is tapered in the overlap region in accordance with a non-linear taper profile determined from the sets of parameter values by computing a scattering rate as a function of waveguide width of the waveguide taper for each of the sets of parameter values, determining an envelope of the scattering rates for the sets of parameter values; and computing the non-linear taper profile based on the envelope.

19. The waveguide transition of claim 18, wherein the bottom waveguide is a silicon waveguide and the top waveguide is a III-V waveguide.

20. The waveguide transition of claim 18, wherein the bottom waveguide is tapered in accordance with the non-linear taper profile.

* * * * *